US010168805B2

(12) United States Patent
Sebastian et al.

(10) Patent No.: US 10,168,805 B2
(45) Date of Patent: Jan. 1, 2019

(54) CONDUCTIVE LAYERED STRUCTURE AND METHODS OF MAKING SAME

(71) Applicant: 3M INNOVATIVE PROPERTIES COMPANY, St. Paul, MN (US)

(72) Inventors: Muthu Sebastian, Singapore (SG); Bret R. Humphries, Clarence Center, NY (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/324,343

(22) PCT Filed: Jul. 29, 2015

(86) PCT No.: PCT/US2015/042609
§ 371 (c)(1),
(2) Date: Jan. 6, 2017

(87) PCT Pub. No.: WO2016/028454
PCT Pub. Date: Feb. 25, 2016

(65) Prior Publication Data
US 2017/0199591 A1    Jul. 13, 2017

Related U.S. Application Data

(60) Provisional application No. 62/038,625, filed on Aug. 18, 2014.

(51) Int. Cl.
*G06F 3/041*    (2006.01)

(52) U.S. Cl.
CPC .... *G06F 3/041* (2013.01); *G06F 2203/04103* (2013.01)

(58) Field of Classification Search
CPC .................... G06F 3/041; G06F 2203/04103
See application file for complete search history.

(56) References Cited

U.S. PATENT DOCUMENTS

| 5,798,323 A | 8/1998 | Honda |
| 5,849,467 A | 12/1998 | Sato |
| 5,886,763 A | 3/1999 | Wolkowicz |
| (Continued) | | |

FOREIGN PATENT DOCUMENTS

| JP | 2006-16460 | 1/2006 |
| JP | 2011-49602 | 3/2011 |
| (Continued) | | |

OTHER PUBLICATIONS

International Search Report for PCT International Application No. PCT/US2015/042609 dated Oct. 8, 2015, 5 pages.

*Primary Examiner* — Adam R. Giesy
(74) *Attorney, Agent, or Firm* — Clifton F. Richardson

(57) ABSTRACT

A device including a transparent or semitransparent substrate and at least one layered structure disposed on a first major surface of the substrate is described. The layered structure includes a first ITO layer on the substrate, a silicon dioxide layer on the first ITO layer opposite the substrate, and a second ITO layer on the silicon dioxide layer opposite the first ITO layer. The silicon dioxide layer includes an edge that is offset inwardly from an edge of the first ITO layer and from an edge of the second ITO layer. Methods of making the device are described.

16 Claims, 9 Drawing Sheets

(56) References Cited

U.S. PATENT DOCUMENTS

| | | |
|---|---|---|
| 6,221,818 B1 | 4/2001 | Lee |
| 6,337,174 B1 | 1/2002 | Jeon |
| 7,348,649 B2 | 3/2008 | Nashiki |
| 2001/0034313 A1 | 10/2001 | Honda |
| 2001/0039251 A1 | 11/2001 | Sachdev |
| 2002/0037820 A1 | 3/2002 | Small |
| 2003/0078173 A1 | 4/2003 | Wojtczak |
| 2003/0152874 A1 | 8/2003 | Nakahara |
| 2003/0170925 A1 | 9/2003 | Kim |
| 2003/0186175 A1 | 10/2003 | Ikemoto |
| 2004/0029051 A1 | 2/2004 | Koita |
| 2004/0219792 A1 | 11/2004 | Chien |
| 2004/0256358 A1 | 12/2004 | Shimizu |
| 2005/0118436 A1 | 6/2005 | Bhangale |
| 2005/0202987 A1 | 9/2005 | Small |
| 2005/0205837 A1 | 9/2005 | Miwa |
| 2005/0252390 A1 | 11/2005 | Chen |
| 2006/0014110 A1 | 1/2006 | Wakiya |
| 2006/0287207 A1 | 12/2006 | Park |
| 2008/0188020 A1 | 8/2008 | Wei-Min |
| 2010/0035378 A1 | 2/2010 | Chang |
| 2010/0190112 A1 | 7/2010 | Wakiya |
| 2010/0320457 A1 | 12/2010 | Matsubara |
| 2014/0124477 A1 | 5/2014 | Sebastian |
| 2014/0186996 A1* | 7/2014 | Takeuchi ............... C09K 13/06 438/104 |

FOREIGN PATENT DOCUMENTS

| | | |
|---|---|---|
| WO | WO 2008-058173 | 5/2008 |
| WO | WO 2010-114056 | 10/2010 |
| WO | WO 2010-127942 | 11/2010 |
| WO | WO 2013-010067 | 1/2013 |
| WO | WO 2013-049267 | 4/2013 |

* cited by examiner

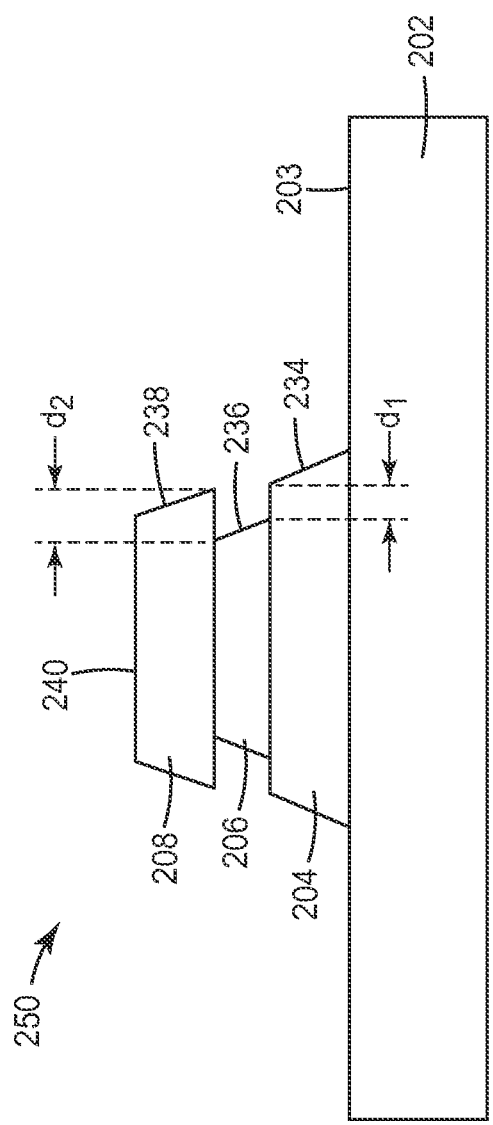

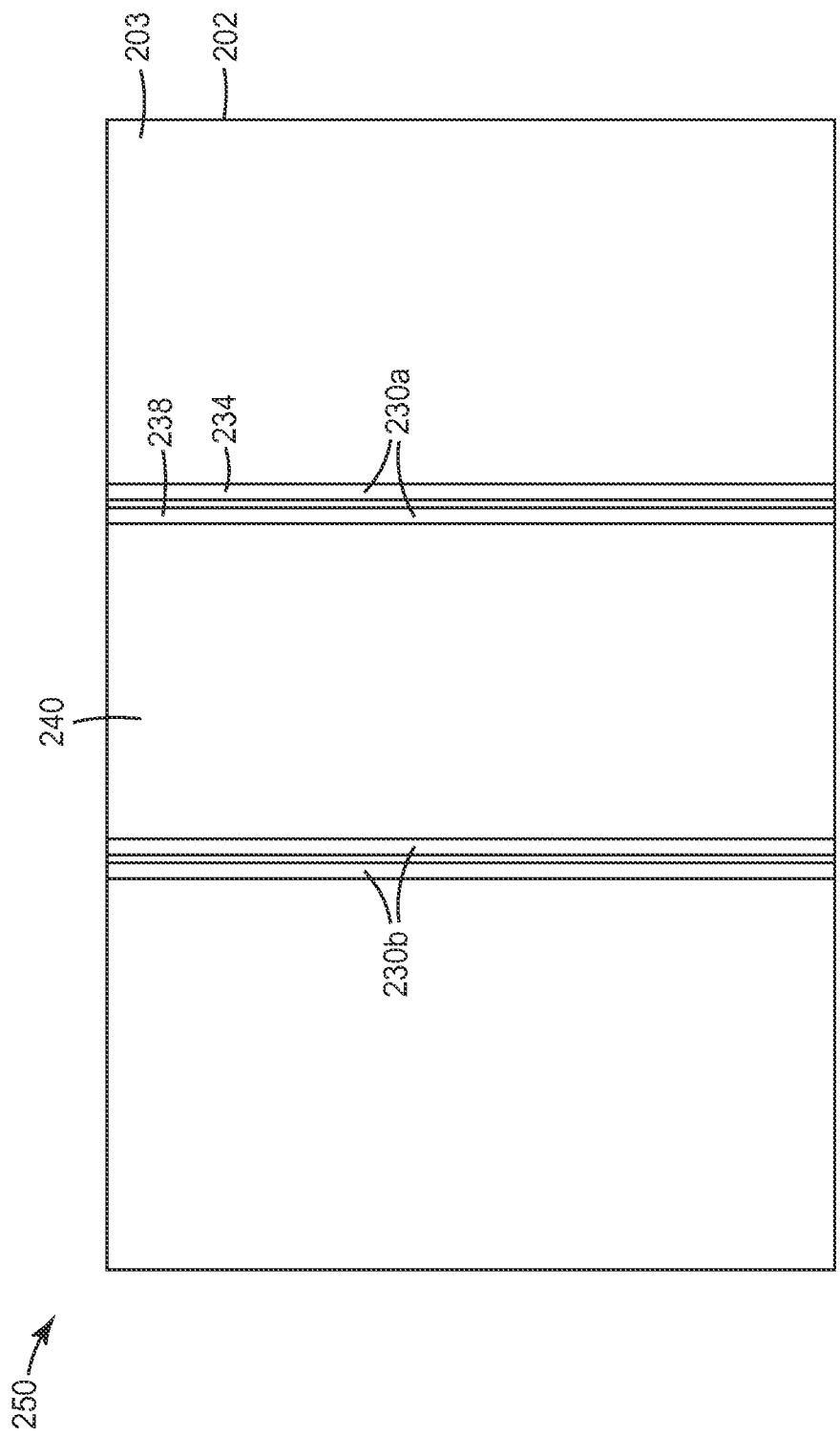

CONDUCTIVE LAYERED STRUCTURE AND METHODS OF MAKING SAME

BACKGROUND

Touch sensitive devices have become an increasingly common way for users to interact with electronic systems, typically those that include tablets, touch phones, and other commercial touch interactive systems. Touch sensitive devices allow a user to conveniently interface with electronic systems and displays by reducing or eliminating the need for mechanical buttons, keypads, keyboards, and pointing devices. For example, a user can carry out a complicated sequence of instructions by simply touching an on-display touch screen at a location identified by an icon.

Touch sensitive screens may employ transparent or semitransparent electrodes formed on a substrate. The electrodes may include indium tin oxide (ITO) and may be formed using an etching process.

SUMMARY

In some aspects of the present description, a structured article including a transparent or semitransparent substrate and at least one first layered structure disposed on a first major surface of the substrate is provided. The at least one first layered structure includes a first edge and includes a first ITO layer adjacent the substrate, a first silicon dioxide layer adjacent the first ITO layer opposite the substrate, and a second ITO layer adjacent the silicon dioxide layer opposite the first ITO layer. The first ITO layer includes a first ITO edge along the first edge; the first silicon dioxide layer includes a first silicon dioxide edge along the first edge; and the second ITO layer includes a second ITO edge along the first edge. The first silicon dioxide edge is offset inwardly from the first ITO edge by a distance $d_1$ greater than zero and the first silicon dioxide edge is offset inwardly from the second ITO edge by a distance $d_2$ greater than zero.

In some aspects of the present description, a method for etching a layered structure having sequential layers of ITO, silicon dioxide, and ITO formed on a transparent or semitransparent substrate is provided. The method includes using a patterned mask to expose a portion of the layered structure; etching the exposed portion of the layered structure to a top surface of the substrate with an acidic solution to produce an etched layered structure leaving a silicon dioxide residue adjacent the top surface of the substrate; and etching the silicon dioxide residue with an etchant formulation different from the acidic solution. The acidic solution contains a transition metal chloride and hydrochloric acid. The etchant formulation is a solution that includes about 20 to about 30 weight percent of at least one water-soluble carbonate compound and about 20 to about 30 weight percent of at least one amino alcohol compound. The etchant formulation removes the patterned mask and etches the silicon dioxide residue.

BRIEF DESCRIPTION OF THE DRAWINGS

FIG. 2A is a cross-sectional view of a structured article;
FIG. 2B is a top view of the structured article of FIG. 2A.

DETAILED DESCRIPTION

Figure 1A:
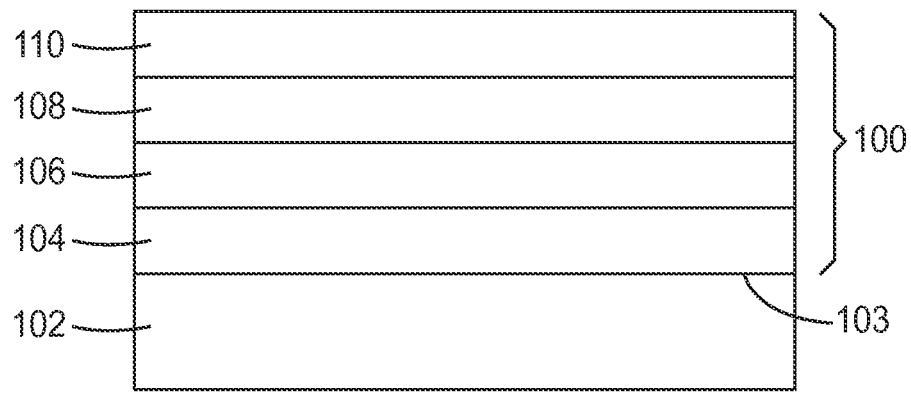
FIGS. 1A-1E are cross-sectional views of a method for etching a layered structure.

In the following description, reference is made to the accompanying set of drawings that form a part of the description hereof and in which are shown by way of illustration specific embodiments. The figures are not necessarily to scale. Unless indicated otherwise, similar features for one embodiment may include the same materials, have the same attributes, and serve the same or similar functions as similar features for other embodiments. Additional or optional features described for one embodiment may also be additional or optional features for other embodiments, even if not explicitly stated, where appropriate. It is to be understood that other embodiments are contemplated and may be made without departing from the scope or spirit of the present description. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

Touch sensitive devices may include layers of patterned transparent conductors as sensing elements. The patterned transparent conductors may include arrays of long, narrow transparent conductive electrodes in the form of rows on a first major surface of a transparent or semitransparent substrate and columns on a second major surface of the substrate opposite the first major surface. Such electrodes may be formed by pattering a layered structure that includes a first ITO layer adjacent the substrate, a silicon dioxide layer adjacent the first ITO layer opposite the substrate, and a second ITO layer adjacent the silicon dioxide layer opposite the first ITO layer. Compared with a single layer of ITO, a layered structure including a second layer of ITO on a layer of silicon dioxide on a first layer of ITO provides improved optical transmittance, reduced brittleness, higher conductivity, and improved reliability in high temperature and humidity conditions. The layered structure may be patterned using the techniques described in PCT Pub. WO 2013/049267 (Sebastian, et al.) and U.S. Pat. App. Pub. No. 2014/0124477 (Sebastian, et al.).

U. S. Pat. App. Pub. No. 2014/0124477 (Sebastian, et al.) describes using an acidic solution containing a transition metal chloride and hydrochloric acid (HCl) to etch a layered structure having sequential layers of ITO, silicon dioxide, and ITO formed on a substrate. As described herein, it has been found that this process can leave a residue of silicon dioxide adjacent the substrate in regions where the etchant was applied. Such residue can interfere with the performance of the electrodes when used as a touch sensor. The residue cannot be effectively removed by etching for a longer time with the acidic solution of U.S. Pat. App. Pub. No. 2014/0124477 (Sebastian, et al.) since this would cause undesired over etching of the electrode. It has been discovered that the residue left from a first etching step can be removed by applying a second etching step where a different etching solution in used. In particular, it has been found that an etchant formulation containing at least one water-soluble carbonate compound at about 20 to about 30 weight percent and at least one amino alcohol compound at about 20 to about 30 weight percent is effective in etching the residue and in removing a patterned mask used in the second etching process.

As used herein, a "water-soluble carbonate compound" is a salt of carbonic acid where at least one percent by weight of the compound is soluble in water at 50° C. Water-soluble carbonate compounds include alkali metal carbonate compounds and ammonium carbonate. In some embodiments, the at least one water-soluble carbonate compound is selected from the group consisting of lithium carbonate, sodium carbonate, potassium carbonate, rubidium carbonate, cesium carbonate, and combinations thereof. In some embodiments, the at least one water-soluble carbonate compound is sodium carbonate.

Suitable amino alcohol compounds include those having the general structure

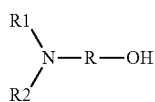

where R1 and R2 are independently selected from the group consisting of hydrogen, alkyl, alkyl amine, aliphatic primary alcohol, aliphatic secondary alcohol, and aliphatic tert-alcohol and R—OH is selected from the group consisting of aliphatic primary alcohol, aliphatic secondary alcohol, aliphatic tert-alcohol, diol, triol, aminoalcohol, and alkoxy alcohol. The number of carbon atoms in R1, R2 and R—OH may be independently in the range of 1 to 20. Examples of suitable compounds include monoethanol amine, N-methyl ethanolamine, N-ethyl ethanolamine; diethanolamine; N-methyl diethanolamine; triethanolamine; 2-aminopropanol; 3-aminopropanol; isopropnolamine; 1-amino-2-methyl-2-propanol; diisopropanolamine; triisoproponolamine; N-methyl isopropanolamine; N-ethyl isopropanolamine; N-methly diisopropanolmine; N-ethyl diisopropanolamine; 3-Amino-1,2-propanediol; 2-Amino-1,3-propanediol; 2-amino-2-(hydroxymethyl)-1,3-propanediol; 1,3-damino-2-propanol; 2-(2-aminoethoxy)ethanol; and 2-[(2-amionethyl)amino]ethanol.

In some embodiments, the at least one amino alcohol compound is selected from the group consisting of monoethanolamine, diethanolamine, triethanolamine, N-tert-butyldiethanolamine, isopropanolamine, 2-(2-aminoethoxy)ethanol, 2-(2-aminoethylamino)ethanol, N-methyl ethanolamine, and combinations thereof. In some embodiments, the at least one amino alcohol compound is monoethanolamine (MEA).

FIGS. 1A-1E illustrate a process for etching a layered structure 100 having sequential layers of ITO, silicon dioxide, and ITO formed on a transparent or semi-transparent substrate 102 having a top surface 103. Layered structure 100 includes a first ITO layer 104 adjacent substrate 102, a silicon dioxide layer 106 adjacent the first ITO layer 104 opposite the substrate 102, and a second ITO layer 108 adjacent the silicon dioxide layer 106 opposite the first ITO layer 104. In the embodiment illustrated in FIG. 1A, a metallic layer 110 is included adjacent second ITO layer 108 opposite silicon dioxide layer 106. Transparent or semi-transparent substrate 102 may be a polymeric film, such as polyethylene terephthalate (PET), or may be glass.

Layered structure 100 may be prepared by sputtering ITO onto substrate 102 forming first ITO layer 104, then sputtering silicon dioxide onto first ITO layer 104 forming silicon dioxide layer 106, then sputtering ITO onto silicon dioxide layer 106 forming second ITO layer 108, and then sputtering a metal, such as copper or a copper alloy, onto second ITO layer 108 forming metallic layer 110. In some embodiments, a second layered structure is formed on substrate 102 opposite layered structure 100. The second layered structure may be sputtered onto substrate 102 simultaneously with the layers of layered structure 100 or may be sputtered onto substrate 102 after layered structure 100 has been formed.

As used herein, "silicon dioxide" includes $SiO_x$ materials and metal-doped $SiO_x$ materials, where x is greater than zero but not necessarily equal to 2. In some embodiments, the dopant in a metal-doped $SiO_x$ may be aluminum, silver or zinc. For example, the silicon dioxide layers of the present description may be aluminum-doped silicon dioxide, which may be referred to as $SiAlO_x$.

Figure 1B:
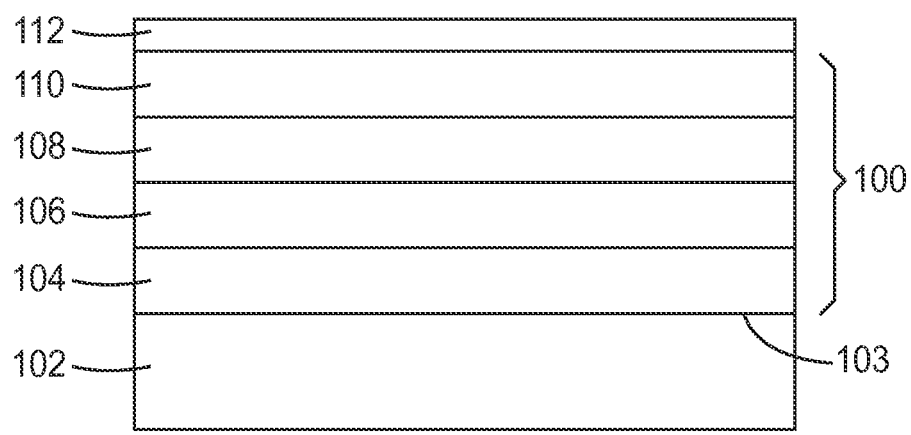
Figure 1C:
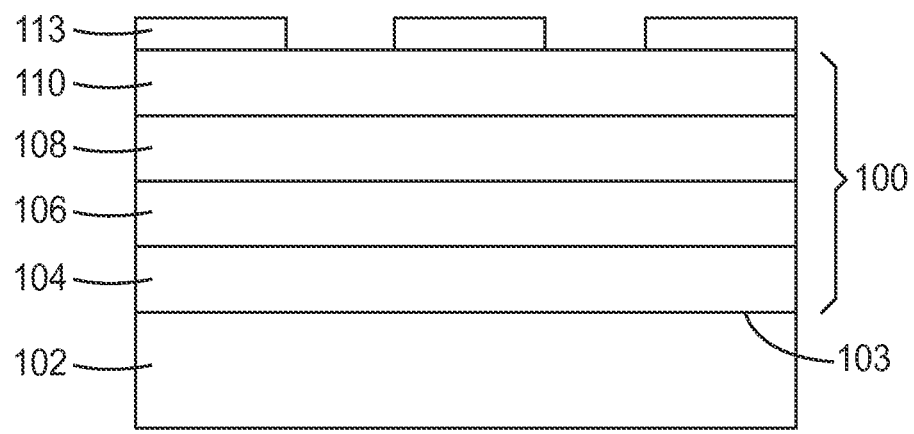

FIG. 1B shows a dry photoresist 112 laminated onto the outer layer of layered structure 100. In the embodiment illustrated in FIG. 1B, the outer layer of layered structure 100 is metallic layer 110. The photoresist 112 may then be developed using standard photolithography techniques of exposing selected areas of photoresist 112 to UV light to produce cross-linking, and developing photoresist 112 with a dilute aqueous solution, thereby removing portions of photoresist 112 which are not cross-linked. This produces a structure as shown in FIG. 1C where the photoresist 112 has formed a patterned mask 113.

Figure 1D:
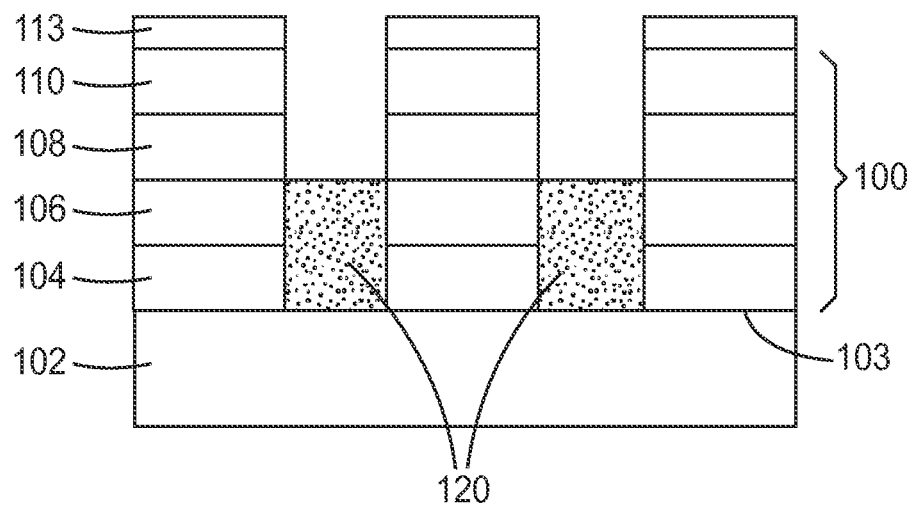

Next, the portions of the layered structure 100 not covered by the patterned mask 113 are exposed to an etching solution and etched to a top surface 103 of the substrate 102 to give the structure shown in FIG. 1D. The etching solution may be an acidic solution containing a transition metal chloride and hydrochloric acid. As noted elsewhere, this step leaves a silicon dioxide residue 120 in regions where the layered structure was etched to the top surface 103 of the substrate 102.

In some embodiments, the transition metal chloride used in the acidic etching solutions is ferric chloride or cupric chloride. Useful cupric chloride concentrations range from about 100 g/l to about 180 g/l. The hydrochloric acid in the acidic etchant composition may have a concentration in the range of about 0.01N to about 1.0N or in the range of about 0.02N to about 1.0N. A value towards the lower end of the range (e.g. below 0.5N) may be chosen to minimize the risk of the concentration of chloride ions rising too high, which might lead to over-etching and/or release of chlorine gas. The concentration range 0.01-1.0N is lower than the concentration range used in conventional techniques for etching ITO, which reduces the risk of the patterned photo-resist mask being stripped before the double ITO structure has been etched. Thus, an etching time can be chosen which etches the double ITO structure in the regions not covered by the patterned photo-resist mask, without damaging the photo-resist.

The time for etching depends upon the type and thickness of the transparent conductive layers and the metallic conductive layers to be etched and is typically from about 10 seconds to about 20 minutes. For example, first ITO layer 104 may be about 20 nm thick, silicon dioxide layer 106 may be a SiAlO$_x$ layer that is about 45 nm thick, second ITO layer 108 may be about 20 nm thick, and metallic layer 110 may be a copper layer having a thickness of about 8 µm. In this case, the etching time may be about 2 minutes when the etching solution is at a temperature of from about 50° C. to about 80° C. In some embodiments, a second layered structure is included on the substrate 102 opposite first layered structure 100. Etching the layered structures on opposing sides of substrate 102 may be done simultaneously or sequentially.

Next, the silicon dioxide residue 120 is removed in a second etching step where an etchant formulation containing at least one water-soluble carbonate compound at about 20 to about 30 weight percent and at least one amino alcohol compound at about 20 to about 30 weight percent is used to etch the silicon dioxide residue 120 and to remove the patterned mask 113. The etching formulation may be an aqueous solution and the remaining about 40 to about 60 weight percent of the formulation may be water. Concentrations of water-soluble carbonate compounds and amino alcohol compounds higher than these ranges may lead to crystal formation in the solution and concentrations lower than these ranges may lead to undesirably long etching times. The etching formulation may be chosen so that the substrate 102, which may be a polymeric film or glass, is not significantly hydrolyzed during the etching the silicon dioxide residue step. For example, the etchant formulation may be an aqueous solution of about 25 weight percent sodium carbonate and about 25 weight percent MEA.

The etching may be carried out at a temperature in a range of about 60° C. to about 90° C. or in a range of about 70° C. to about 90° C. The etching time typically is smaller at higher temperatures. Temperatures below about 60° C. may not be desirable due to the long etching time that would be required. In some embodiments, the etching the silicon dioxide residue step is conducted for about 20 seconds to about 2 minutes. Temperatures above 90° C. may not be desired because this could cause the water in an aqueous etching solution to evaporate too quickly.

Figure 1E:
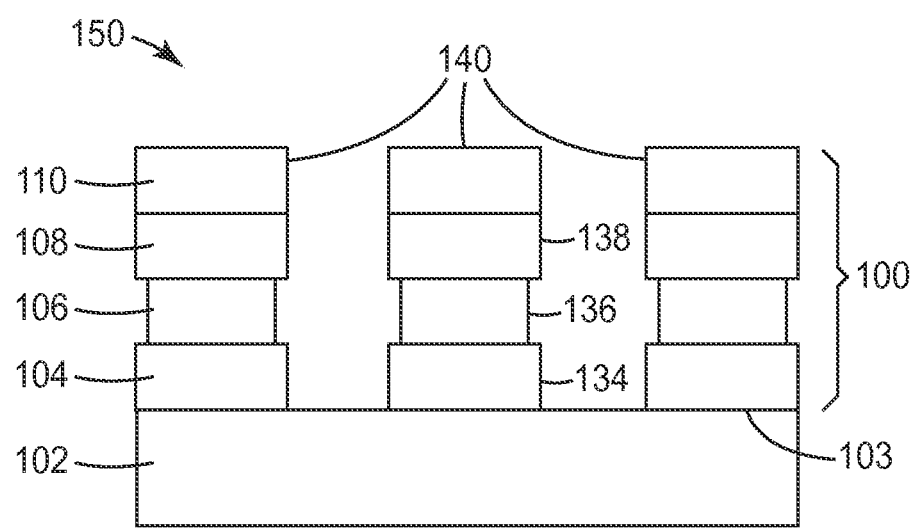

The step of etching the silicon dioxide residue 120 results in the structured article 150 having layered structures 140 as shown in FIG. 1E. In the illustrated embodiment, a plurality of layered structures 140 is formed. As a result of this etching step, the silicon dioxide edge 136 is offset inwardly from each of a first ITO edge 134 and a second ITO edge 138.

In some embodiments, after removing the silicon dioxide residue, an ITO residue may be left in the regions between the patterned layered structures. This residue can be removed by exposing the etched layered structure to a sulfuric acid solution after etching the silicon dioxide residue. In some embodiments, the sulfuric acid solution has a concentration of sulfuric acid in the range of about 5 to about 15 weight percent, for example, about 8 percent.

In some embodiments, portions of metallic layer 110 will be removed in an additional etching step resulting in at least one transparent or semitransparent electrode with a metallic pattern formed on the edges of the electrode. Conductive circuits may also be formed in the additional etching step. In at least one embodiment, the desired pattern for metallic layer 110 includes a circuit for connecting the transparent or semitransparent electrode to a device, such as, e.g., a touch sensitive device. In some embodiments, the additional etching step uses an etchant that does not etch ITO. For example, the etchant may be ammonia-based. An ammonia-based etchant may selectively etch the metallic conductive layers (e.g., copper) without affecting the transparent conductive layers (e.g. ITO-SiAlO$_x$-ITO). In an alternate embodiment, metallic layer 110 is not included in layered structure 100. In this case, an additional etching step is not needed, but an additional step of attaching a circuit to the resulting transparent or semitransparent electrodes is needed. This may be done, for example, by printing a conductive ink.

FIG. 2A shows a cross-sectional view of structured article 250 including a layered structure 240 disposed on major surface 203 of transparent or semitransparent substrate 202. FIG. 2B shows a top view of structured article 250. Layered structure 240 includes first ITO layer 204, silicon dioxide layer 206 and second ITO layer 208. First ITO layer 204 includes first ITO edge 234, silicon dioxide layer 206 includes silicon dioxide edge 236, and second ITO layer 208 includes second ITO edge 238. In some embodiments, the edges 234, 234 and 238 are not perpendicular to the major surface 203 of the substrate 202. Layered structure 240 includes first edge 230a and second edge 230b. First ITO edge 234, silicon dioxide edge 236, and second ITO edge 238 extend along first edge 230a of layered structure 240. Silicon dioxide edge 236 is offset inwardly from first ITO edge 234 by a distance $d_1$ greater than zero and silicon dioxide edge 236 is offset inwardly from second ITO edge 238 by a distance $d_2$ greater than zero. Since silicon dioxide edge 236 is offset inwardly from first ITO edge 234 and from second ITO edge 238 it is not visible in the top view of FIG. 2B. In some embodiments, each of $d_1$ and $d_2$ are in a range of about 1 micrometer to about 30 micrometers or in a range of about 2 micrometers to about 20 micrometers. In some embodiments, $d_1$ and $d_2$ are substantially equal.

Figure 3:
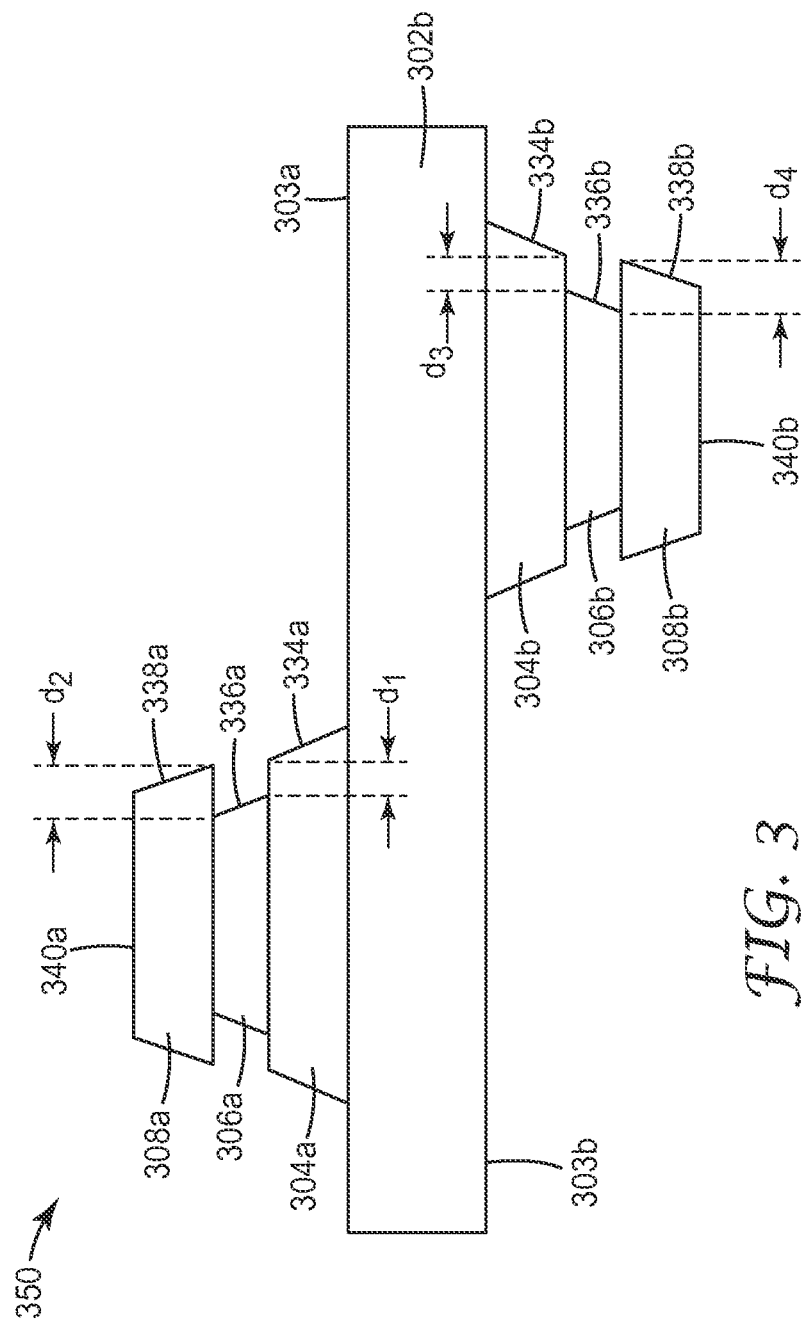
FIG. 3 is a cross-sectional view of a structured article.

In some embodiments, the structured article further includes at least one second layered structure disposed on a second major surface of the substrate opposite the first major surface. This is illustrated in FIG. 3 where the structured article 350 includes first layered structure 340a disposed on a first major surface 303a of the transparent or semitransparent substrate 302 and second layered structure 340b disposed on a second major surface 303b of substrate 302. Such structured articles can be formed by etching first and second layered structures on opposite sides of substrate 302 simultaneously or sequentially using the etching technique described elsewhere. First layered structure 340a includes first ITO layer 304a adjacent substrate 302, first silicon dioxide layer 306a adjacent first ITO layer 304a opposite substrate 302, and second ITO layer 308a adjacent first silicon dioxide layer 306a opposite first ITO layer 304a. First ITO layer 304a includes first ITO edge 334a, first silicon dioxide layer 306a includes first silicon dioxide edge 336a, and second ITO layer 308a includes second ITO edge 338a. First ITO edge 334a, first silicon dioxide edge 236a, and second ITO edge 238a extend along a common first edge of first layered structure 340a. First silicon dioxide edge 336a is offset inwardly from first ITO edge 334a by a distance $d_1$ greater than zero and first silicon dioxide edge 236a is offset inwardly from second ITO edge 238a by a distance $d_2$ greater than zero. In some embodiments, each of $d_1$ and $d_2$ are in a range of about 1 micrometer to about 30 micrometers or in a range of about 2 micrometers to about 20 micrometers. In some embodiments, $d_1$ and $d_2$ are substantially equal.

Second layered structure 340b includes third ITO layer 304b adjacent substrate 302, second silicon dioxide layer 306a adjacent third ITO layer 304b opposite substrate 302, and fourth ITO layer 308b adjacent second silicon dioxide layer 306b opposite third ITO layer 304b. Third ITO layer 304b includes third ITO edge 334b, second silicon dioxide layer 306b includes second silicon dioxide edge 336b, and fourth ITO layer 308b includes fourth ITO edge 338b. Third ITO edge 334b, second silicon dioxide edge 236b, and fourth ITO edge 238b extend along a common second edge of second layered structure 340b. Second silicon dioxide edge 336b is offset inwardly from third ITO edge 334b by a distance $d_3$ greater than zero and second silicon dioxide edge 236b is offset inwardly from fourth ITO edge 238b by a distance $d_4$ greater than zero. In some embodiments, each of $d_3$ and $d_4$ are in a range of about 1 micrometer to about 30 micrometers or in a range of about 2 micrometers to about 20 micrometers. In some embodiments, $d_3$ and $d_4$ are substantially equal.

Figure 4:
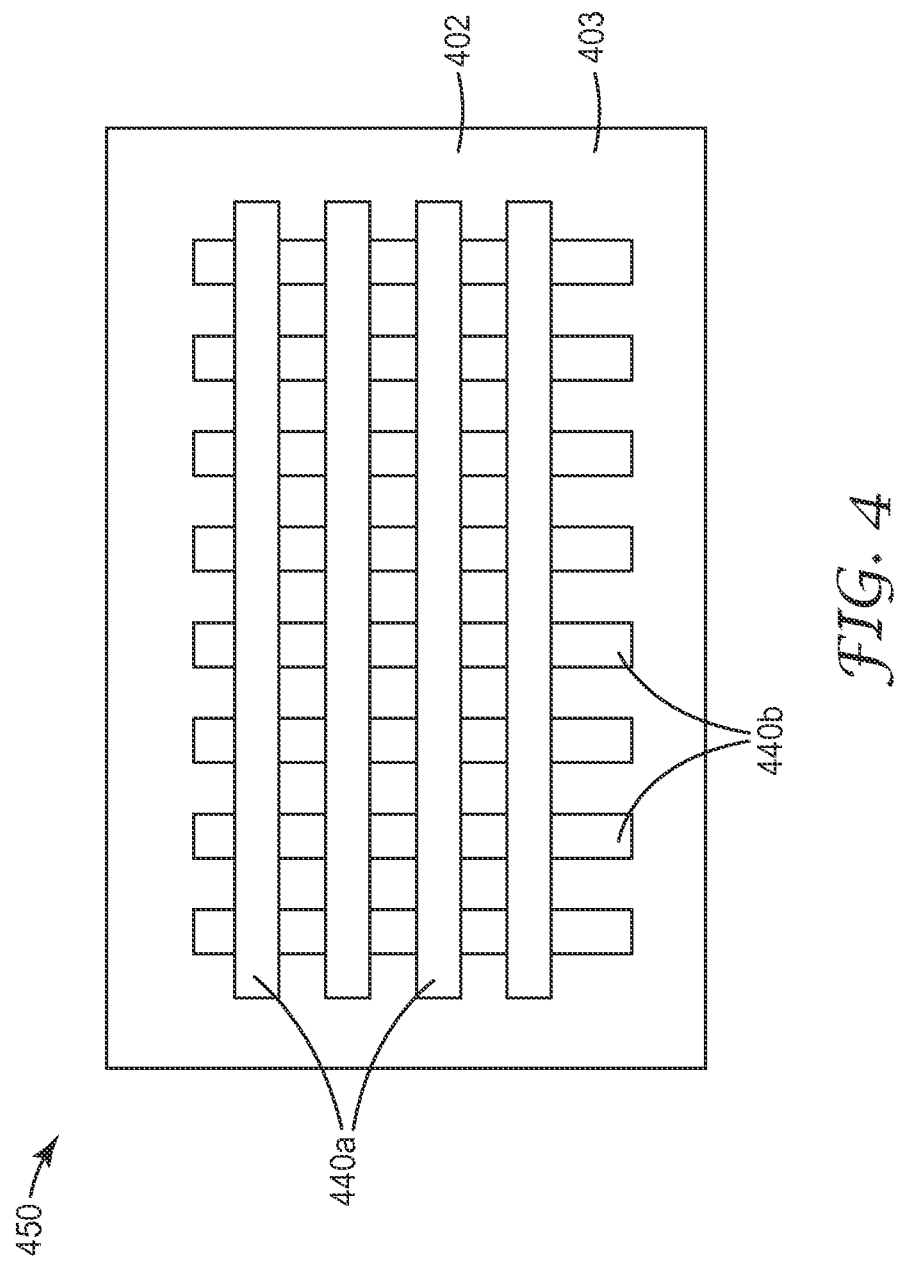
FIG. 4 is a top view of a touch sensor panel.

In some embodiments, a transparent or semitransparent touch screen including a structured article of the present description is provided. The electrode patterns used in the structured article may embody bars, triangles, honeycombs, or any other suitable pattern. The transparent electrodes may be coupled to electronic components that detect changes in inter-electrode, or electrode-to-ground capacitance, and thereby determine the coordinates of a touch or near touch. The structured article may include matrix type electrodes which include row and column electrodes on the opposing sides of a substrate. This is illustrated in FIG. 4 which shows structured article 450 including a plurality of first layered structures 440a disposed on first major surface 403 of substrate 402 and a plurality of second layered structures 440b disposed on a second major surface of substrate 402 opposite first major surface 403. First layered structures 440a are row electrodes and second layered structures 440b are column electrodes. Conductive circuits for connecting layered structures 440a and 440b to a touch panel controller can be provided on structured article 450 using an etching process, for example, as described elsewhere. Structured article 450 can then be used as a transparent or semitransparent touch sensor panel of a touch screen in a touch sensitive device as described in PCT Publication WO 2013/049267 (Sebastian et al.), for example.

EXAMPLES

Comparative Example C1

To prepare a layered structure, first, ITO was sputtered using thin film web sputter coating equipment onto a PET substrate having a thickness of about 125 μm, available under the trade designation MELINEX ST 506 from DuPont Teijin Films, Chester, Va., U.S.A., forming a first ITO layer having a thickness of about 25 nm. Then, silicon dioxide was sputtered using thin film web sputter coating equipment onto the ITO layer, forming a silicon dioxide layer having a thickness of about 45 nm. Then, ITO was sputtered using thin film web sputter coating equipment onto the silicon dioxide layer, forming a second ITO layer having a thickness of about 25 nm. Then, copper was electrodeposited onto the second ITO layer, forming a copper layer having a thickness of about 6 μm.

Then, a photoresist, available under the trade designation Kolon dry film KM1150 from Kolon Industries, Inc., Kwacheon City, Republic of Korea, was laminated in a roll-to-roll process at a temperature of about 110° C. and a pressure of about 33 psi (0.23 MPa) using a roll-to-roll laminator machine to the copper layer of the layered structure, forming a photoresist layer. Then, the photoresist layer was selectively exposed to UV light at an intensity of 50-120 mJ/cm$^2$ using a conventional phototool of the desired pattern. This step polymerized the UV light-exposed areas while protecting the UV light-masked areas from polymerization. Then, the UV light-exposed photoresist layer was developed using a dilute sodium bicarbonate solution (0.8 wt %) as known to one of ordinary skill in the art. In this step, the polymerized photoresist layer remains intact whereas the non-polymerized photoresist is removed from the substrate, resulting in the desired photoresist pattern on the copper layer.

Then, the layered structure was etched using cupric chloride etchant including 180 g/l cupric chloride ($CuCl_2$), available from Mercury Chemicals Pte Ltd, Singapore, and 1.5 N hydrogen chloride (HCl), available from Mercury Chemicals Pte Ltd, Singapore, at a temperature of about 50° C. using a roll-to-roll etching machine. The etchant was sprayed through a nozzle at a spray pressure of about 30-40 psi (0.21-0.28 MPa). This etching step removed the copper layer, the second ITO layer, the silicon dioxide layer, and the first ITO layer, respectively, in the areas where the photoresist layer was not present. Then, the photoresist layer was stripped using a stripping solution including 25 wt % monoethanolamine (MEA), available from Aik Moh Paints & Chemicals Pte Ltd, Singapore, in water at a temperature of about 45° C. using a roll-to-roll stripper machine. The stripper solution was sprayed in a roll-to-roll process through a nozzle at a spray pressure of about 20 psi (0.14 MPa). Then, the etched layered structure was rinsed with water by spraying it onto the layered structure, and air dried. An image of the resulting layered structure is provided in FIG. 5.

Figure 5:
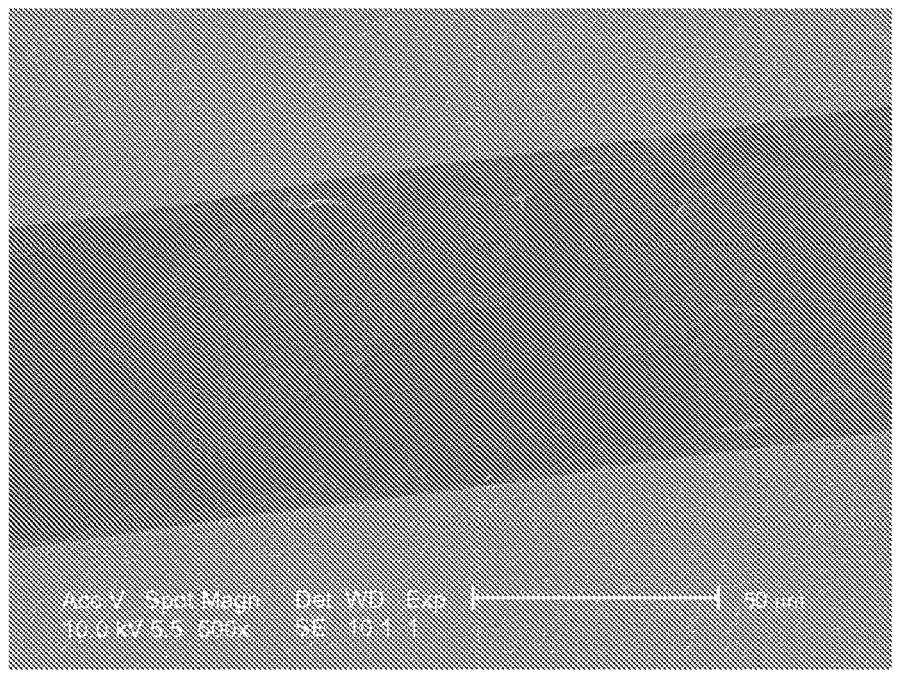
FIGS. 5-7 are images of etched layered structures.

FIG. 5 illustrates a 75 μm recess (the darker area) representing an area where the copper layer, the second ITO layer, the silicon dioxide layer, and the first ITO layer, respectively, were removed by the etching step. As can be seen in FIG. 5, broken silicon dioxide residue still remained in this recess.

Example 1

To prepare a layered structure, first, ITO was sputtered using thin film web sputter coating equipment onto a PET substrate having a thickness of about 125 μm, available under the trade designation MELINEX ST 506 from DuPont Teijin Films, Chester, Va., U.S.A., forming a first ITO layer having a thickness of about 25 nm. Then, silicon dioxide was sputtered using thin film web sputter coating equipment onto the ITO layer, forming a silicon dioxide layer having a thickness of about 45 nm. Then, ITO was sputtered using thin film web sputter coating equipment onto the silicon dioxide layer, forming a second ITO layer having a thickness of about 25 nm. Then, copper was electrodeposited onto the second ITO layer, forming a copper layer having a thickness of about 6 μm.

Then, a photoresist, available under the trade designation Kolon dry film KM1150 from Kolon Industries, Inc., Kwacheon City, Republic of Korea, was laminated in a roll-to-roll process at a temperature of about 110° C. and a pressure of about 33 psi (0.23 MPa) using a roll-to-roll laminator machine to the copper layer of the layered structure, forming a photoresist layer. Then, the photoresist layer was selectively exposed to UV light at an intensity of 50-120 mJ/cm$^2$ using a conventional phototool of the desired pattern. This step polymerized the UV light-exposed areas while protecting the UV light-masked areas from polymerization. Then, the UV light-exposed photoresist layer was developed using a dilute sodium bicarbonate solution (0.8 wt %) as known to one of ordinary skill in the art. In this step, the polymerized photoresist layer remains intact whereas the non-polymerized photoresist is removed from the substrate, resulting in the desired photoresist pattern on the copper layer.

Then, the layered structure was etched using cupric chloride etchant including 180 g/l cupric chloride ($CuCl_2$), available from Mercury Chemicals Pte Ltd, Singapore, and 1.5 N hydrogen chloride (HCl), available from Mercury Chemicals Pte Ltd, Singapore, at a temperature of about 50° C. using a roll-to-roll etching machine. The etchant was sprayed through a nozzle at a spray pressure of about 30-40 psi (0.21-0.28 MPa). This etching step removed the copper layer, the second ITO layer, the silicon dioxide layer, and the first ITO layer, respectively, in the areas where the photoresist layer was not present. Then, the photoresist layer was stripped and silicon dioxide residue was etched using a stripping solution including 25 wt % monoethanolamine (MEA), available from Aik Moh Paints & Chemicals Pte Ltd, Singapore, and 25 wt % sodium carbonate, available from Mercury Chemicals Pte Ltd, Singapore, in water at a temperature of about 80° C. The stripper solution was sprayed through a nozzle in a roll-to-roll process at a spray pressure of about 40 psi (0.28 MPa). Then, the etched layered structure was rinsed with water by spraying it onto the layered structure. Then, the remaining trace of ITO residue was removed by spraying 8 wt % sulphuric acid, available from Kimic Chemitech (S) Pte Ltd, Singapore, onto the layered structure. Then, the layered structure was rinsed with water by spraying it onto the layered structure, and air dried. An image of the resulting layered structure is provided in FIG. 6.

Figure 6:
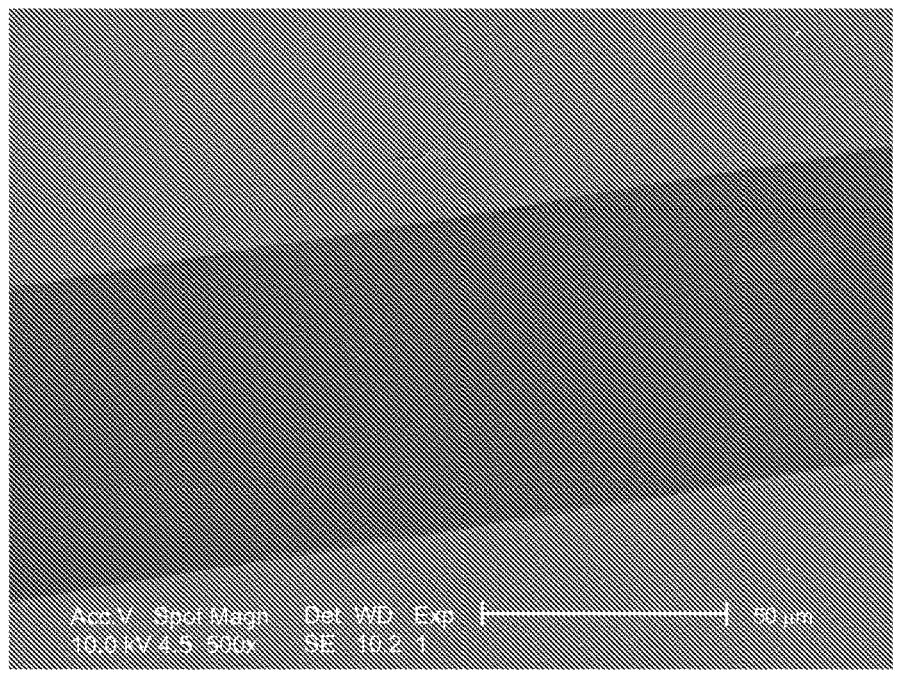

FIG. 6 illustrates a 75 μm recess (the darker area) representing an area where the copper layer, the second ITO layer, the silicon dioxide layer, and the first ITO layer, respectively, were removed by the etching step. As can be seen in FIG. 6, no silicon dioxide residue remained in this recess as a result of using the MEA and sodium carbonate mixture as a stripper solution.

Example 2

To prepare a layered structure, first, ITO was sputtered using thin film web sputter coating equipment onto a PET substrate having a thickness of about 125 μm, available under the trade designation MELINEX ST 506 from DuPont Teijin Films, Chester, Va., U.S.A., forming a first ITO layer having a thickness of about 25 nm. Then, silicon dioxide was sputtered using thin film web sputter coating equipment onto the ITO layer, forming a silicon dioxide layer having a thickness of about 45 nm. Then, ITO was sputtered using thin film web sputter coating equipment onto the silicon dioxide layer, forming a second ITO layer having a thickness of about 25 nm. Then, copper was electrodeposited onto the second ITO layer, forming a copper layer having a thickness of about 6 μm.

Then, a photoresist, available under the trade designation Kolon dry film KM1150 from Kolon Industries, Inc., Kwacheon City, Republic of Korea, was laminated in a roll-to-roll process at a temperature of about 110° C. and a pressure of about 33 psi (0.23 MPa) using a roll-to-roll laminator machine to the copper layer of the layered structure, forming a photoresist layer. Then, the photoresist layer was selectively exposed to UV light at an intensity of 50-120 mJ/cm$^2$ using a conventional phototool of the desired pattern. This step polymerized the UV light-exposed areas while protecting the UV light-masked areas from polymerization. Then, the UV light-exposed photoresist layer was developed using a dilute sodium bicarbonate solution (0.8 wt %) as known to one of ordinary skill in the art. In this step, the polymerized photoresist layer remains intact whereas the non-polymerized photoresist is removed from the substrate, resulting in the desired photoresist pattern on the copper layer.

Then, the layered structure was etched using cupric chloride etchant including 180 g/l cupric chloride ($CuCl_2$), available from Mercury Chemicals Pte Ltd, Singapore, and 1.5 N hydrogen chloride (HCl), available from Mercury Chemicals Pte Ltd, Singapore, at a temperature of about 50° C. using a roll-to-roll etching machine. The etchant was sprayed through a nozzle at a spray pressure of about 30-40 psi (0.21-0.28 MPa). This etching step removed the copper layer, the second ITO layer, the silicon dioxide layer, and the first ITO layer, respectively, in the areas where the photoresist layer was not present. Then, the photoresist layer was stripped and silicon dioxide residue was etched using a stripping solution including 25 wt % monoethanolamine (MEA), available from Aik Moh Paints & Chemicals Pte Ltd, Singapore, and 25 wt % sodium carbonate, available from Mercury Chemicals Pte Ltd, Singapore in water at a temperature of about 80° C. The stripper solution was sprayed through a nozzle in a roll-to-roll process at a spray pressure of about 40 psi (0.28 MPa). Then, the copper layer was selectively etched from the layered structure using a mixture of 8 moles/liter of cupric chloride, available from Mercury Chemicals Pte Ltd, Singapore, 6.5 moles/liter ammonium chloride, and the pH value of the solution was kept at 8.5 by adding 28 wt % ammonium hydroxide, available from Pride-Chem Industries Pte Ltd, Singapore. The etching was done using this mixture at a temperature of about 50° C. Then, the etched layered structure was rinsed with dilute ammonium hydroxide. Finally substrate was rinsed with fresh water and air dried. An image of the resulting layered structure is provided in FIG. 7.

Figure 7:
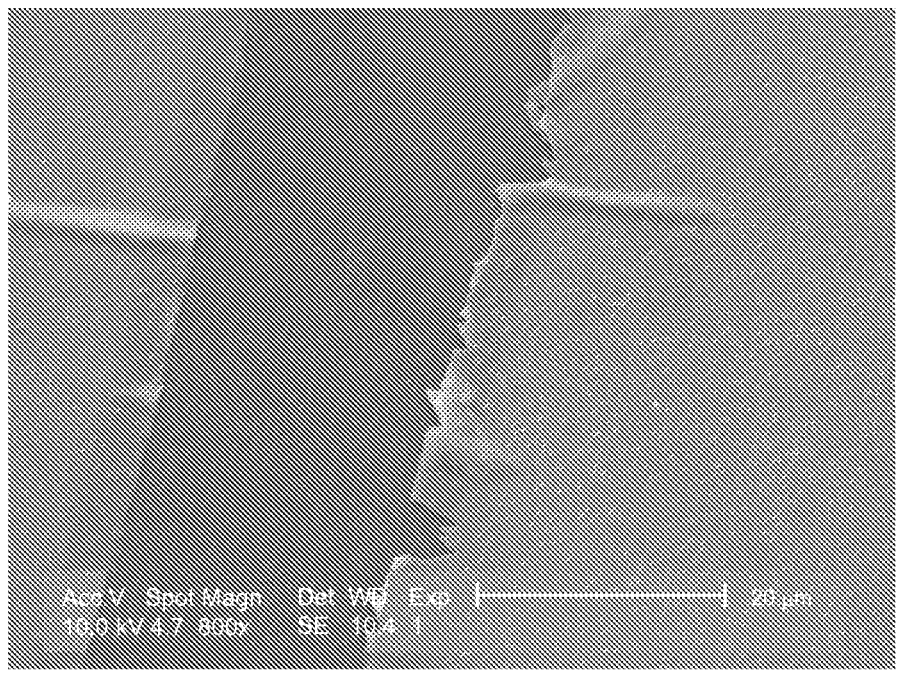

FIG. 7 illustrates a 75 μm recess (the darkest area) representing an area where the second ITO layer, the silicon dioxide layer, and the first ITO layer, respectively, were removed by the first etching step. As can be seen in FIG. 7, no silicon dioxide residue remained in this recess as a result of using the MEA and sodium carbonate mixture as a stripper solution. FIG. 7 also illustrates areas at the edges of the darkest area representing areas where the silicon dioxide layer was removed but the first and second ITO layers are still present. In other words, in these areas the silicon dioxide edge is offset inwardly from the first and second ITO layers.

The following is a list of exemplary embodiments of some aspects of the present description.

Embodiment 1 is a structured article comprising:
a transparent or semitransparent substrate;
at least one first layered structure disposed on a first major surface of the substrate and comprising a first edge, the at least one first layered structure including:

a first ITO layer adjacent the substrate, the first ITO layer comprising a first ITO edge along the first edge, a first silicon dioxide layer adjacent the first ITO layer opposite the substrate, the first silicon dioxide layer comprising a first silicon dioxide edge along the first edge, and a second ITO layer adjacent the silicon dioxide layer opposite the first ITO layer, the second ITO layer comprising a second ITO edge along the first edge, wherein the first silicon dioxide edge is offset inwardly from the first ITO edge by a distance $d_1$ greater than zero and the first silicon dioxide edge is offset inwardly from the second ITO edge by a distance $d_2$ greater than zero.

Embodiment 2 is the structured article of embodiment 1, wherein $d_1$ is substantially equal to $d_2$.

Embodiment 3 is the structured article of embodiment 1, wherein each of $d_1$ and $d_2$ is in a range of about 1 micrometer to about 30 micrometers.

Embodiment 4 is the structured article of embodiment 1, wherein the first silicon dioxide layer includes silicon dioxide doped with metal.

Embodiment 5 is the structured article of embodiment 4, wherein the silicon dioxide doped with metal is aluminum-doped silicon dioxide ($SiAlO_x$).

Embodiment 6 is the structured article of embodiment 1, wherein the substrate is a polymeric film or glass.

Embodiment 7 is the structured article of embodiment 1, wherein the at least one first layered structure is a plurality of layered structures.

Embodiment 8 is the structured article of embodiment 1, further comprising at least one second layered structure disposed on a second major surface of the substrate opposite the first major surface of the substrate and comprising a second edge, the second layered structure including:

a third ITO layer adjacent the substrate, the third ITO layer comprising a third ITO edge along the second edge, a second silicon dioxide layer adjacent the third ITO layer opposite the substrate, the second silicon dioxide layer comprising a second silicon dioxide edge along the second edge, and a fourth ITO layer adjacent the second silicon dioxide layer opposite the third ITO layer, the fourth ITO layer comprising a fourth ITO edge along the second edge.

Embodiment 9 is the structured article of embodiment 8, wherein the second silicon dioxide edge is offset inwardly from the third ITO edge by a distance $d_3$ greater than zero and the second silicon dioxide edge is offset inwardly from the fourth ITO edge by a distance $d_4$ greater than zero.

Embodiment 10 is the structured article of embodiment 9, wherein each of $d_3$ and $d_4$ is in a range of about 1 micrometer to about 30 micrometers.

Embodiment 11 is a transparent or semi-transparent touch screen comprising the structured article of any of embodiments 1-10.

Embodiment 12 is a method for etching a layered structure having sequential layers of ITO, silicon dioxide, and ITO formed on a transparent or semi-transparent substrate, the method comprising:

using a patterned mask to expose a portion of the layered structure;

etching the exposed portion of the layered structure to a top surface of the substrate with an acidic solution to produce an etched layered structure leaving a silicon dioxide residue adjacent the top surface of the substrate, the acidic solution containing a transition metal chloride and hydrochloric acid; and etching the silicon dioxide residue with an etchant formulation different from the acidic solution, wherein the etchant formulation removes the patterned mask and etches the silicon dioxide residue and the etchant formulation is a solution that includes about 20 to about 30 weight percent of at least one water-soluble carbonate compound and about 20 to about 30 weight percent of at least one amino alcohol compound.

Embodiment 13 is the method of embodiment 12, wherein the at least one water-soluble carbonate compound is selected from the group consisting of ammonium carbonate, lithium carbonate, sodium carbonate, potassium carbonate, rubidium carbonate, cesium carbonate, and combinations thereof.

Embodiment 14 is the method of embodiment 12, wherein the at least one amino alcohol compound is selected from the group consisting of monoethanolamine, diethanolamine, triethanolamine, N-tert-butyldiethanolamine, isopropanolamine, 2-(2-aminoethoxy)ethanol, 2-(2-aminoethylamino)ethanol, N-methyl ethanolamine, and combinations thereof.

Embodiment 15 is the method of embodiment 12, wherein the substrate is a polymeric film or glass and the substrate is not significantly hydrolyzed during the etching the silicon dioxide residue step.

Embodiment 16 is the method of embodiment 12, wherein the etching the silicon dioxide residue step is conducted at a temperature in a range of about 60° C. to about 90° C.

Embodiment 17 is the method of embodiment 12, wherein the at least one water-soluble carbonate compound is sodium carbonate and the at least one amino alcohol compound is monoethanolamine.

Embodiment 18 is the method of embodiment 12, further comprising the step of exposing the etched layered structure to a sulfuric acid solution to remove an ITO residue after etching the silicon dioxide residue.

Embodiment 19 is the method of embodiment 18, wherein the sulfuric acid solution has a concentration of sulfuric acid in the range of about 5 to about 15 weight percent.

Embodiment 20 is the method of embodiment 12, wherein the silicon dioxide is doped with metal.

Embodiment 21 is the method of embodiment 20, wherein the silicon dioxide is an aluminum-doped silicon dioxide ($SiAlO_x$).

Embodiment 22 is the method of embodiment 12, wherein the etching the silicon dioxide residue step is conducted for about 20 seconds to about 2 minutes.

Embodiment 23 is the method of embodiment 12, wherein the etching the silicon dioxide residue step results in a silicon dioxide edge offset inwardly from each of a first and a second ITO edge.

Embodiment 24 is the method of embodiment 12, wherein the layered structure includes a metallic layer adjacent the sequential layers of ITO, silicon dioxide, and ITO opposite the transparent or semi-transparent substrate.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A structured article comprising:
   a transparent or semitransparent substrate;
   at least one first layered structure disposed on a first major surface of the substrate and comprising a first edge, the at least one first layered structure including:
      a first ITO layer adjacent the substrate, the first ITO layer comprising a first ITO edge along the first edge,
      a first silicon dioxide layer adjacent the first ITO layer opposite the substrate, the first silicon dioxide layer comprising a first silicon dioxide edge along the first edge, and
      a second ITO layer adjacent the first silicon dioxide layer opposite the first ITO layer, the second ITO layer comprising a second ITO edge along the first edge,
      wherein the first silicon dioxide edge is offset inwardly from the first ITO edge by a distance $d_1$ greater than zero and the first silicon dioxide edge is offset inwardly from the second ITO edge by a distance $d_2$ greater than zero.

2. The structured article of claim 1, wherein $d_1$ is substantially equal to $d_2$.

3. The structured article of claim 1, wherein each of $d_1$ and $d_2$ is in a range of about 1 micrometer to about 30 micrometers.

4. The structured article of claim 1, wherein the first silicon dioxide layer includes silicon dioxide doped with metal.

5. The structured article of claim 4, wherein the silicon dioxide doped with metal is aluminum-doped silicon dioxide ($SiAlO_x$).

6. The structured article of claim 1, wherein the substrate is a polymeric film or glass.

7. The structured article of claim 1, wherein the at least one first layered structure is a plurality of layered structures.

8. The structured article of claim 1, further comprising at least one second layered structure disposed on a second major surface of the substrate opposite the first major surface of the substrate and comprising a second edge, the second layered structure including:
   a third ITO layer adjacent the substrate, the third ITO layer comprising a third ITO edge along the second edge,
   a second silicon dioxide layer adjacent the third ITO layer opposite the substrate, the second silicon dioxide layer comprising a second silicon dioxide edge along the second edge, and
   a fourth ITO layer adjacent the second silicon dioxide layer opposite the third ITO layer, the fourth ITO layer comprising a fourth ITO edge along the second edge.

9. The structured article of claim 8, wherein the second silicon dioxide edge is offset inwardly from the third ITO edge by a distance $d_3$ greater than zero and the second silicon dioxide edge is offset inwardly from the fourth ITO edge by a distance $d_4$ greater than zero.

10. The structured article of claim 9, wherein each of $d_3$ and $d_4$ is in a range of about 1 micrometer to about 30 micrometers.

11. A transparent or semi-transparent touch screen comprising the structured article of claim 1.

12. A method for etching a layered structure having sequential layers of ITO, silicon dioxide, and ITO formed on a transparent or semi-transparent substrate, the method comprising:
   using a patterned mask to expose a portion of the layered structure;
   etching the exposed portion of the layered structure to a top surface of the substrate with an acidic solution to produce an etched layered structure leaving a silicon dioxide residue adjacent the top surface of the substrate, the acidic solution containing a transition metal chloride and hydrochloric acid; and
   etching the silicon dioxide residue with an etchant formulation different from the acidic solution,
   wherein the etchant formulation removes the patterned mask and etches the silicon dioxide residue and the etchant formulation is a solution that includes about 20 to about 30 weight percent of at least one water-soluble carbonate compound and about 20 to about 30 weight percent of at least one amino alcohol compound.

13. The method of claim 12, wherein the substrate is a polymeric film or glass and the substrate is not significantly hydrolyzed during the etching the silicon dioxide residue step.

14. The method of claim 12, wherein the at least one water-soluble carbonate compound is sodium carbonate and the at least one amino alcohol compound is monoethanolamine.

15. The method of claim 12, further comprising the step of exposing the etched layered structure to a sulfuric acid solution to remove an ITO residue after etching the silicon dioxide residue.

16. The method of claim 12, wherein the etching the silicon dioxide residue step results in a silicon dioxide edge offset inwardly from each of a first and a second ITO edge.

* * * * *

UNITED STATES PATENT AND TRADEMARK OFFICE
CERTIFICATE OF CORRECTION

PATENT NO. : 10,168,805 B2  
APPLICATION NO. : 15/324343  
DATED : January 1, 2019  
INVENTOR(S) : Sebastian et al.

Page 1 of 1

It is certified that error appears in the above-identified patent and that said Letters Patent is hereby corrected as shown below:

In the Specification

<u>Column 11</u>  
Line 13, delete "$d_z$" and insert -- $d_2$ --, therefor.

Signed and Sealed this  
Third Day of September, 2019

Andrei Iancu  
*Director of the United States Patent and Trademark Office*